United States Patent
An

(10) Patent No.: US 8,333,407 B2
(45) Date of Patent: Dec. 18, 2012

(54) KNEE BOLSTER FOR VEHICLES

(75) Inventor: Jae Hyun An, Seosan-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 64 days.

(21) Appl. No.: 12/957,097

(22) Filed: Nov. 30, 2010

(65) Prior Publication Data

US 2012/0068447 A1    Mar. 22, 2012

(30) Foreign Application Priority Data

Sep. 17, 2010    (KR) .......................... 10-2010-0091706

(51) Int. Cl.
*B60R 21/045* (2006.01)

(52) U.S. Cl. ........................................ 280/752; 280/751

(58) Field of Classification Search .................. 280/748, 280/750, 751, 752; 296/187.05, 193.02
See application file for complete search history.

(56) References Cited

U.S. PATENT DOCUMENTS

| | | | |
|---|---|---|---|
| 5,577,770 A * | 11/1996 | Sinner et al. ................... | 280/752 |
| 6,837,518 B2 * | 1/2005 | Mullan .......................... | 280/752 |
| 7,125,045 B2 * | 10/2006 | Fuks et al. .................... | 280/748 |
| 2005/0156421 A1 * | 7/2005 | Nykiel et al. ................. | 280/752 |
| 2007/0164548 A1 * | 7/2007 | Abe et al. ..................... | 280/752 |
| 2010/0259036 A1 * | 10/2010 | Taracko ........................ | 280/752 |

* cited by examiner

*Primary Examiner* — Joseph Rocca
*Assistant Examiner* — Robert A Coker
(74) *Attorney, Agent, or Firm* — Morgan, Lewis & Bockius LLP

(57) ABSTRACT

A knee bolster for vehicles, which is placed inside a lower instrument panel of a vehicle and is mounted to a cowl cross bar and relieves shock applied to knees of a passenger in case of an accident, may include a U-shaped bracket mounted to the cowl cross bar and bent to form a U-shape to be deformed by an external force during the accident, thus primarily absorbing knee load of the passenger, and a shock absorbing foam mounted in the U-shaped bracket, being deformed by the external force during the accident, and sliding along inner surface of the U-shaped bracket, thus secondarily absorbing the knee load of the passenger.

9 Claims, 11 Drawing Sheets

KNEE BOLSTER FOR VEHICLES

CROSS-REFERENCE TO RELATED APPLICATIONS

The present application claims priority to Korean Patent Application No. 10-2010-0091706 filed on Sep. 17, 2010, the entire contents of which is incorporated herein for all purposes by this reference.

BACKGROUND OF THE INVENTION

1. Field of the Invention

The present invention relates, in general, to a knee bolster for vehicles and, more particularly, to a knee bolster for vehicles, which achieves compliance with the pedestrian protection regulations of the reinforced North American NCAP (New Car Assessment Program) in crash tests and can minimize the production cost, and can simplify the production process.

2. Description of Related Art

Generally, in car accidents, passengers including the driver sitting in the front seat of a vehicle move forwards and come into contact with the lower instrument panel placed in front of the front seats. In the above state, when the lower instrument panel is easily deformed, the knees of the front passengers may exceedingly move forwards so that the heads and chests of the passengers may lean backwards too much and airbags may fail to successfully protect the passengers from the crash energy. In an effort to solve such a problem, a knee bolster is installed inside the lower instrument panel placed in front of the front seats such that the knee bolster can prevent the knees of the front passengers from moving deeply in towards the lower instrument panel and can absorb the crash energy in case of an accident.

Therefore, the knee bolster is designated as a restraining device which can control the posture of a front passenger in an accident such that the knee movement of the front seat passenger can be limited and the crash energy can be evenly distributed to the upper and lower parts of the passenger's body. The knee bolster can keep the damage done to the knees of a front passenger within a predetermined level and can prevent the knees of the front passenger from moving too deeply into the lower instrument panel in case of an accident, thus allowing the passenger to be successfully protected by an airbag. The limits of knee load, chest load and chest displacement in accidents are set out by regulations. Thus, when producing vehicles, it is important to achieve compliance with the regulations of respective localities. Further, improving the performance of vehicles to maximize the commercial value of the vehicles is recognized as an important task for respective local commercial value tests.

FIG. 1 is a perspective view illustrating the construction of a conventional knee bolster for vehicles. As shown in FIG. 1, the conventional knee bolster includes an L-shaped knee bolster bracket 2 mounted to a cowl cross bar 1, a reinforcing bracket 3 held in back of the knee bolster bracket 2, and a knee bolster plate (not shown) installed in front of the knee bolster bracket 2.

When the knee load of a front passenger is applied to the conventional knee bolster in an accident, the knee bolster bracket 2 receives most of the knee load and the reinforcing bracket 3 controls the strain and the penetration rate.

However, the conventional knee bolster is designed such that absorption of the knee load in an accident can be realized by the knee bolster bracket 2 deforming, so that the conventional knee bolster cannot efficiently absorb the load applied to the knees of the passenger and does not achieve compliance with the pedestrian protection regulations of the reinforced North American NCAP. Described in detail, although the pedestrian protection regulations of the former North American NCAP required a knee load not exceeding 10 kN as being an allowable reference load, the pedestrian protection regulations of the reinforced North American NCAP require the knee load to not exceed 2.8 kN. However, the conventional knee bolster technique cannot achieve compliance with the pedestrian protection regulations of the reinforced North American NCAP.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a knee bolster for vehicles, in which a combined structure of a U-shaped bracket and a shock absorbing foam is adapted and thus the knee load of a passenger involved in an accident can be absorbed by two deformations, of the U-shaped bracket and deformation of the shock absorbing foam, so that the knee bolster can achieve compliance with the pedestrian protection regulations of the reinforced North American NCAP.

In an aspect of the present invention, a knee bolster for vehicles, which may be placed inside a lower instrument panel of a vehicle and may be mounted to a cowl cross bar and relieves shock applied to knees of a passenger in case of an accident, may include a U-shaped bracket mounted to the cowl cross bar and bent to form a U-shape to be deformed by an external force during the accident, thus primarily absorbing knee load of the passenger, and a shock absorbing foam mounted in the U-shaped bracket, being deformed by the external force during the accident, and sliding along inner surface of the U-shaped bracket, thus secondarily absorbing the knee load of the passenger.

The shock absorbing foam may include a sliding protrusion formed in a front part of the shock absorbing foam, a sliding groove formed in a rear part of the shock absorbing foam, and a locking protrusion formed in the sliding groove.

The U-shaped bracket may include a rear unit mounted to the cowl cross bar and extending downwards with a predetermined length, a U-shaped front unit connected to a lower part of the rear unit, and a reinforcing unit extending between upper and lower parts of the rear unit and reinforcing a rear strength of the U-shaped bracket.

The front unit may include a U-shaped body part attached to the rear unit, and an extension part extending upwards from the U-shaped body part to form the U-shape.

The U-shaped bracket may include a guide groove formed in the extension part of the front unit of the U-shaped bracket and slidably receives the shock absorbing foam to guide sliding movement of the shock absorbing foam when the external force may be applied thereto wherein the rear unit of the U-shaped bracket may include a locking hole to lock the shock absorbing foam to the rear unit temporarily.

The U-shaped body part of the front unit may be provided with a deformation inducing hole for inducing deformation of the U-shaped bracket in response to striking of a knee of an approximately 5% shorter leg into the knee bolster, wherein a second deformation inducing notch may be formed around the deformation inducing hole.

A first deformation inducing notch may be formed between the extension part and the body part of the front unit and induces deformation of the U-shaped bracket in response to striking of a knee of an approximately 50% longer leg into the knee bolster.

An upper part of the rear unit may be bent twice and forms a double bent portion, with a third deformation inducing notch and a fourth deformation inducing notch formed in the double bent portion and respectively inducing deformation of the rear part of the U-shaped bracket in response to striking of a knee of an approximately 5% shorter leg and striking of a knee of an approximately 50% longer leg into the knee bolster.

The rear unit, the body part of the front unit and the reinforcing unit of the U-shaped bracket may be coupled to each other in an overlapping manner, thus forming an overlapping reinforcement part which reinforces the rear strength of the U-shaped bracket in an accident.

As described above, the knee bolster for vehicles according to the present invention uses a combined structure of a U-shaped bracket and shock absorbing foam and thus can absorb the knee load of a passenger in an accident by two deformations, namely, of the U-shaped bracket and deformation of the shock absorbing foam, so that the knee bolster can achieve compliance with the pedestrian protection regulations of the reinforced North American NCAP.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
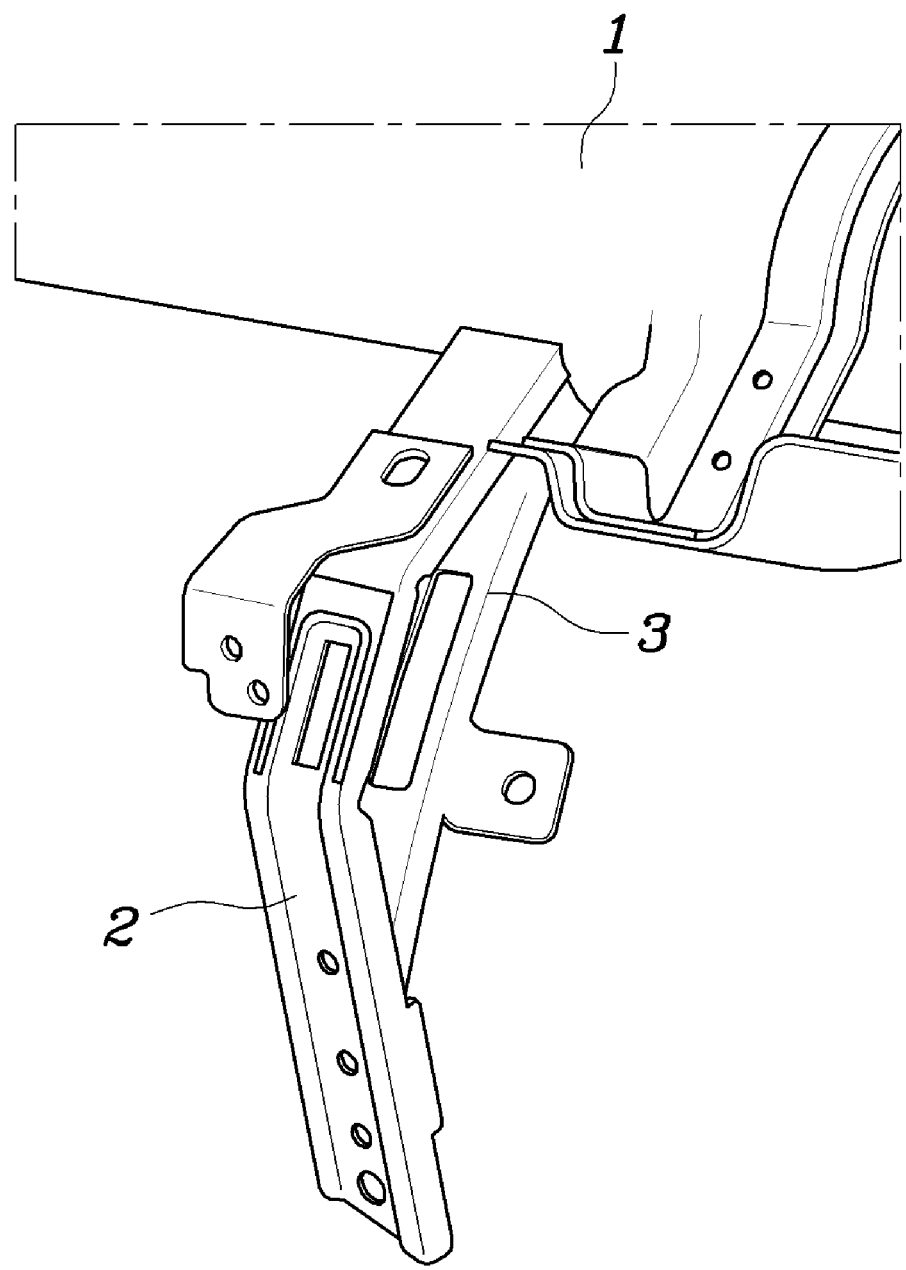
FIG. 1 is a view illustrating the construction of a conventional knee bolster for vehicles.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, a knee bolster for vehicles according to an exemplary embodiment of the present invention will be described with reference to the accompany drawings.

Figure 2:
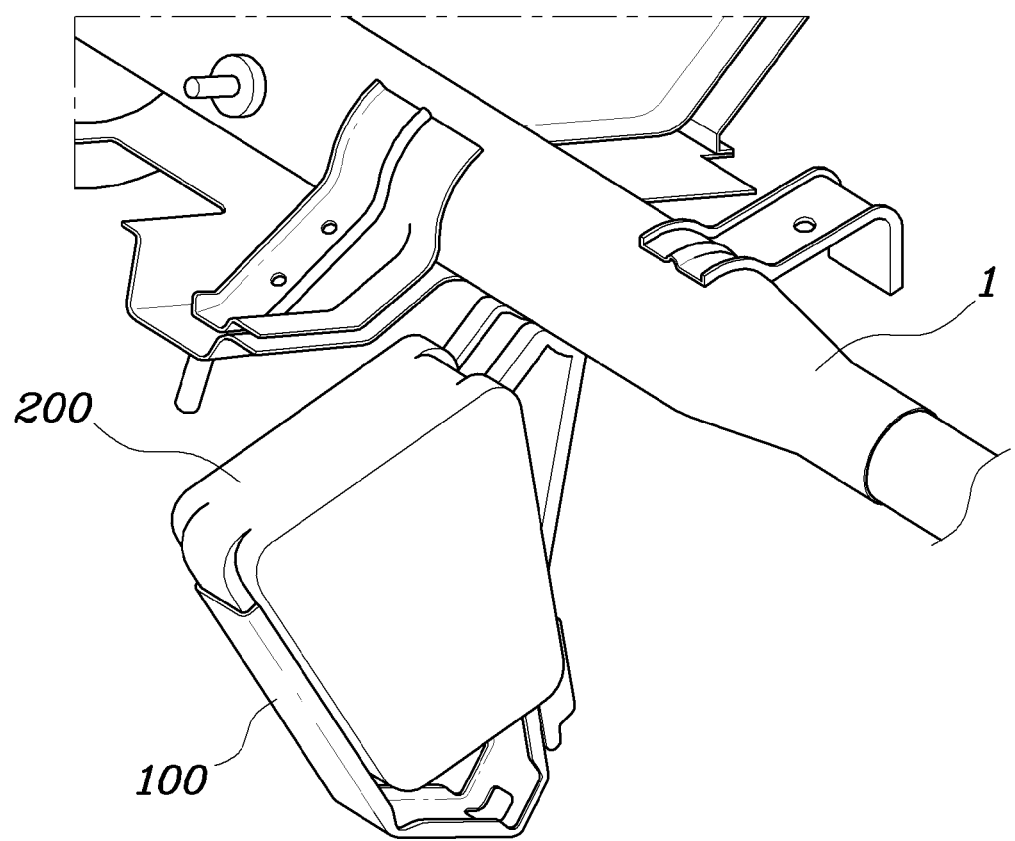
FIG. 2 is a view illustrating the construction of a knee bolster for vehicles according to an exemplary embodiment of the present invention.
Figure 3:
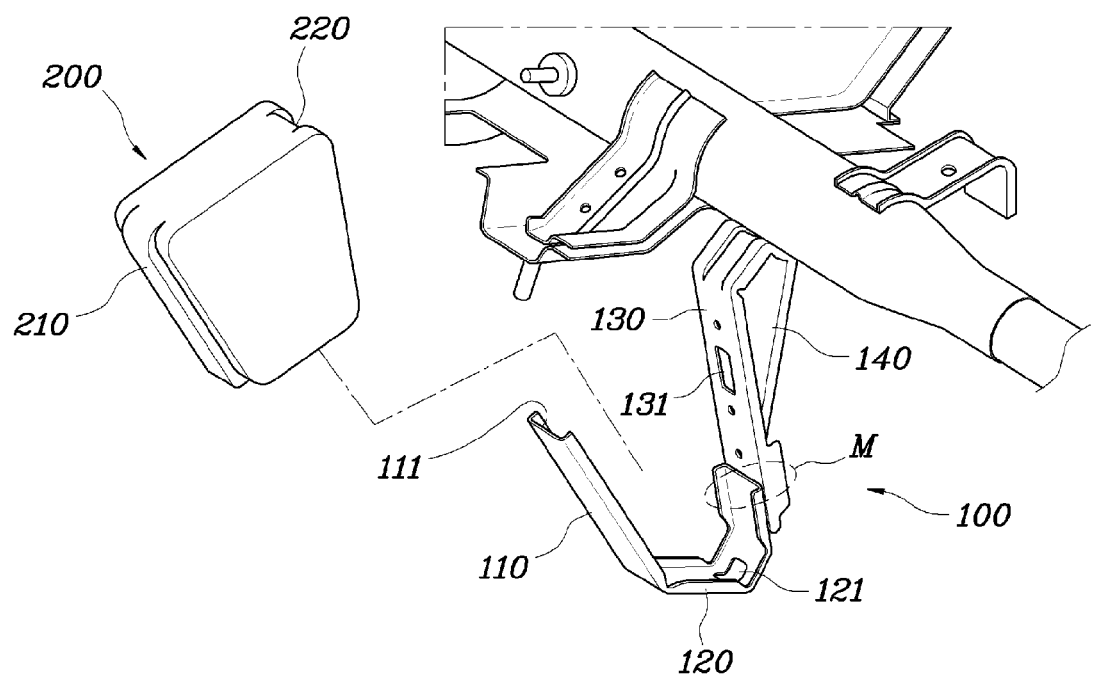
FIG. 3 is an exploded perspective view of the knee bolster for vehicles according to the exemplary embodiment of the present invention.
Figure 4:
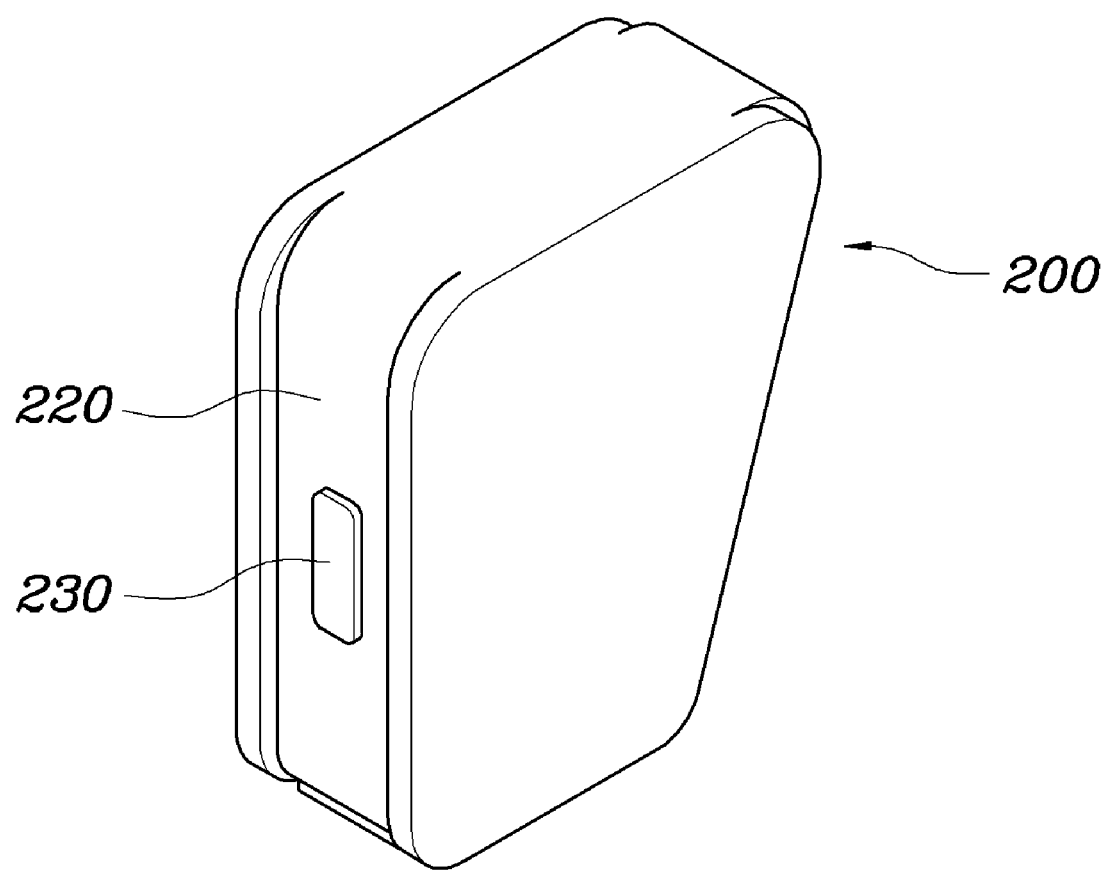
FIG. 4 is a view illustrating a shock absorbing foam used in the knee bolster for vehicles according to the exemplary embodiment of the present invention.

As shown in FIG. 2 through FIG. 4, the knee bolster for vehicles according to the exemplary embodiment of the present invention is a shock absorbing device, which is located inside a lower instrument panel and is mounted to a cowl cross bar 1 of a car body, and relieves crash energy applied to the knees of a passenger in an accident.

The knee bolster for vehicles of the present invention includes a U-shaped bracket 100 mounted to the cowl cross bar 1 and a shock absorbing foam 200 combined with the U-shaped bracket 100.

The U-shaped bracket 100 is mounted to the cowl cross bar 1 and is bent such that the bracket 100 has a U-shaped structure. The U-shaped bracket 100 is deformed in an accident and primarily absorbs the knee load of the passenger in the accident.

The U-shaped bracket 100 includes a rear unit 130, which is securely mounted to the cowl cross bar 1 and extends downwards, a U-shaped front unit connected to the lower part of the rear unit 130, and a reinforcing unit 140 extending between the upper and lower parts of the rear unit 130 and reinforcing the rear strength of the U-shaped bracket 100.

The front unit includes a U-shaped body part 120 and an extension part 110 extending upwards from the body part 120.

The shock absorbing foam 200 is combined with the U-shaped bracket 100 and is deformed in an accident and, at the same time, slides upwards along the U-shaped bracket 100, and thereby secondarily absorbs the knee load of the passenger in the accident.

The shock absorbing foam 200 has a sliding protrusion 210 in a front part thereof and a sliding groove 220 in a rear part thereof.

The extension part 110 of the front unit of the U-shaped bracket 100 has a guide groove 111, which guides sliding movement of the sliding protrusion 210.

The sliding groove 220 formed in the back of the shock absorbing foam 200 is slidable along the rear unit 130.

As shown in FIG. 4, the sliding groove 220 of the shock absorbing foam 200 has a locking protrusion 230 used for locking the shock absorbing foam 200 to the rear unit 130 of the U-shaped bracket 100. As shown in FIG. 3, the rear unit 130 has a locking hole 131 into which the locking protrusion 230 is inserted and locked thereto.

Figure 5:
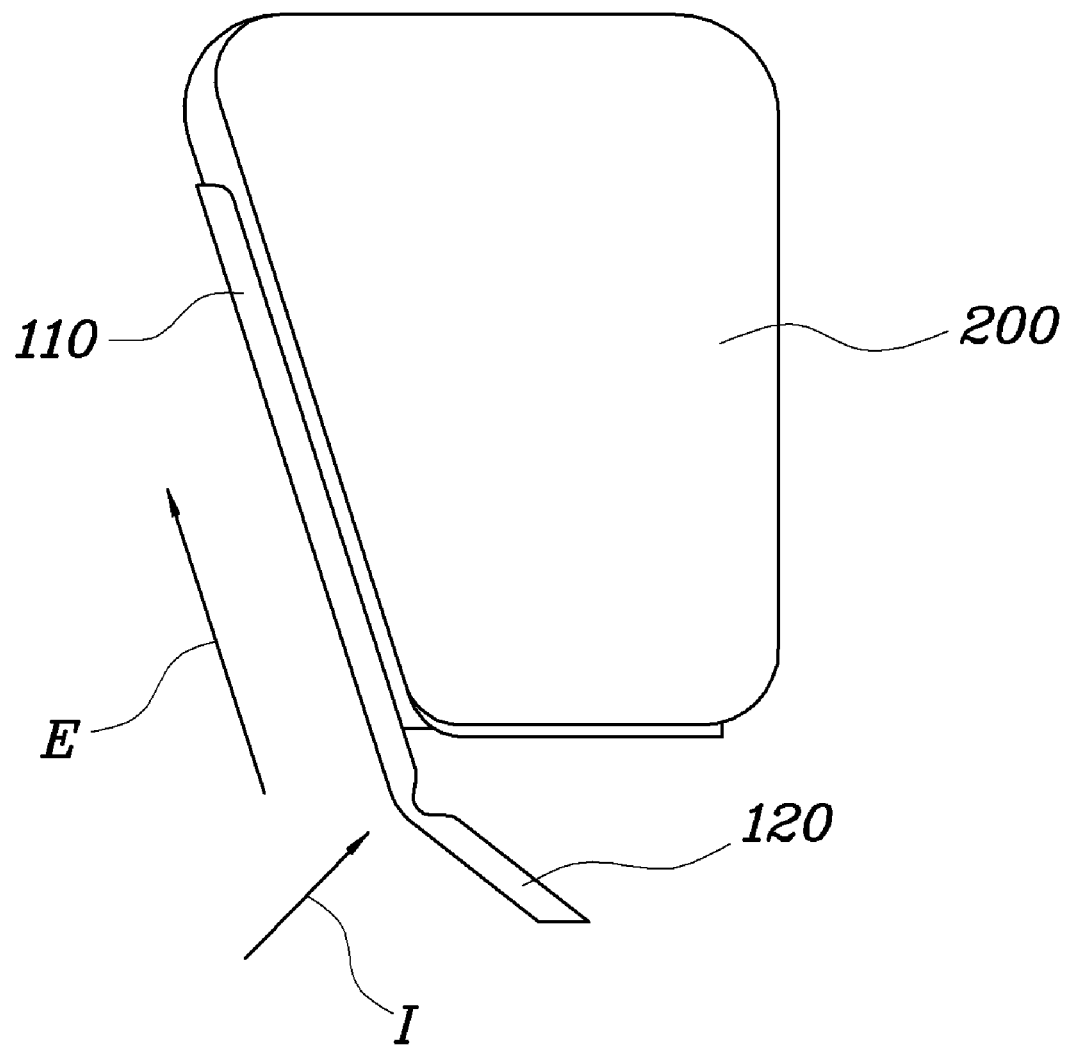
FIG. 5 is a view illustrating sliding movement of the shock absorbing foam in an accident.

In other words, the rear part of the shock absorbing foam 200 is mounted to the U-shaped bracket 100. However, the front part of the shock absorbing foam 200 is not fixed, but is slidable along the extension part 110 of the front unit of the U-shaped bracket 100. Therefore, when shock from the crash is applied upwards to the shock absorbing foam 200 from a lower position as shown by arrow I in FIG. 5, the shock absorbing foam 200 slides along the extension part 110 of the front unit in a direction of arrow E and absorbs the knee load of the passenger. The sliding action of the shock absorbing foam 200 realizes an additional shock absorbing mechanism, which is added to a shock absorbing mechanism formed by deformation of the shock absorbing foam 200 and absorbing the knee load of the passenger, thus further improving the pedestrian protection performance afforded by the knee bolster of the present invention.

Figure 6:
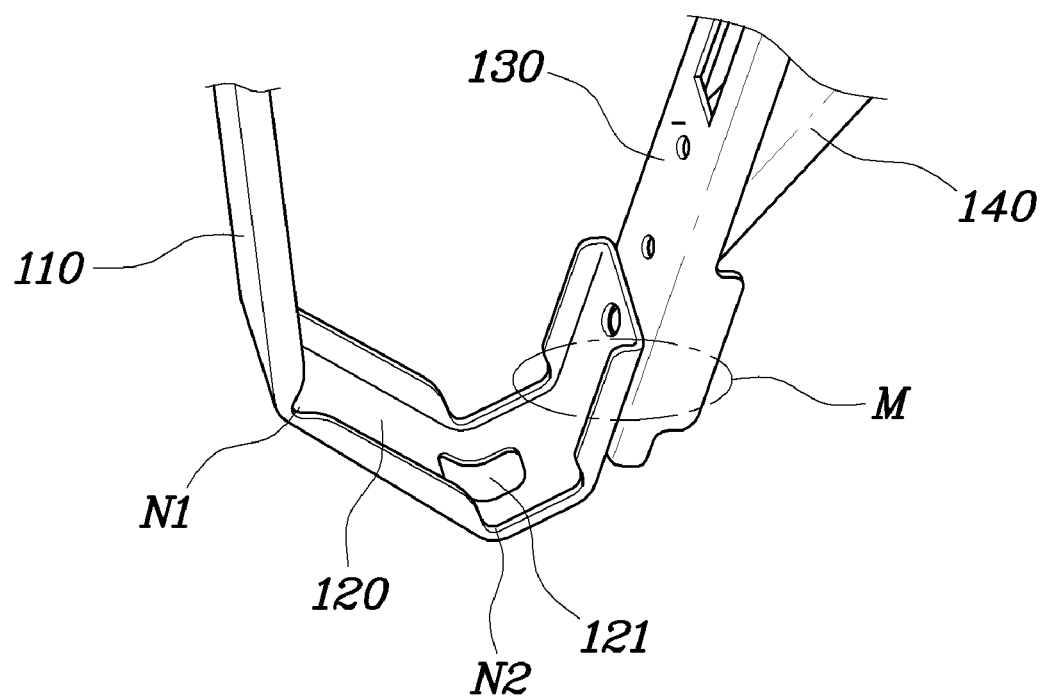
FIG. 6 is a view illustrating a U-shaped bracket used in the knee bolster for vehicles according to the exemplary embodiment of the present invention.

As shown in FIG. 6, the body part 120 of the front unit of the U-shaped bracket 100 is provided with a deformation inducing hole 121. When the knee S of a 5% shorter leg strikes into the knee bolster, the deformation inducing hole 121 induces deformation of the U-shaped bracket 100. Further, to induce deformation of the U-shaped bracket 100 in response to striking of the knee L of a 50% longer leg into the knee bolster, a first deformation inducing notch N1 is formed between the extension part 110 and the body part 120 of the front unit of the U-shaped bracket 100.

In another exemplary embodiment of the present invention, a second deformation inducing notch N2 is formed near the deformation inducing hole 121.

Further, in the U-shaped bracket 100, the rear unit 130, the body part 120 of the front unit and the reinforcing unit 140 are coupled to each other in an overlapping manner, thus forming an overlapping reinforcement part M which reinforces the rear strength of the U-shaped bracket 100 in an accident.

Figure 7:
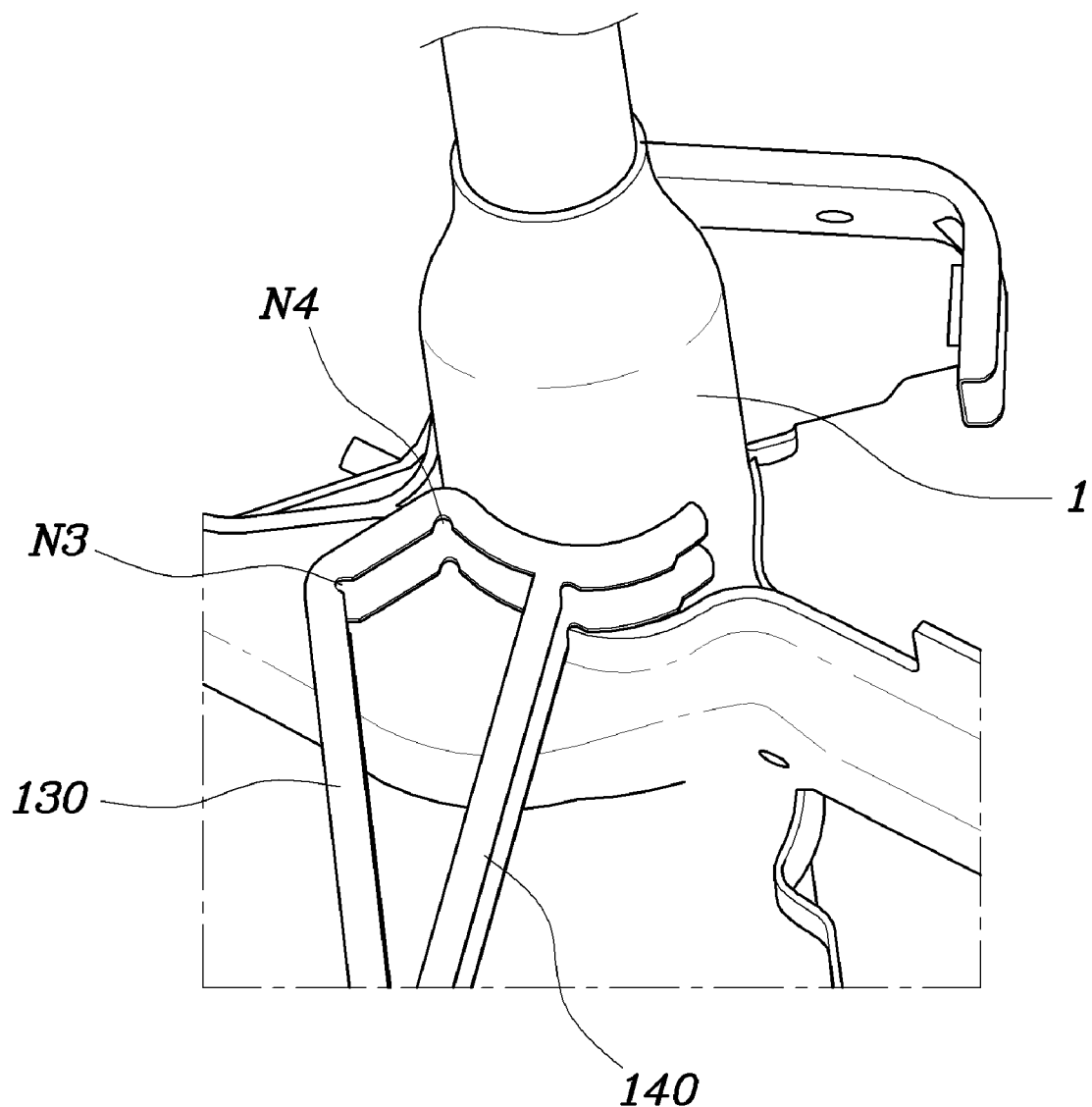
FIG. 7 is a view illustrating a rear unit and a reinforcing unit of the U-shaped bracket used in the knee bolster for vehicles according to the exemplary embodiment of the present invention.

Further, the upper part of the rear unit 130 is bent twice and forms a double bent portion as shown in FIG. 7. A third deformation inducing notch N3 and a fourth deformation inducing notch N4 are formed in the double bent portion and respectively induce deformation of the rear part of the U-shaped bracket 100 in response to striking of the knee of a 5% shorter leg and striking of the knee of a 50% longer leg into the knee bolster.

Figure 8:
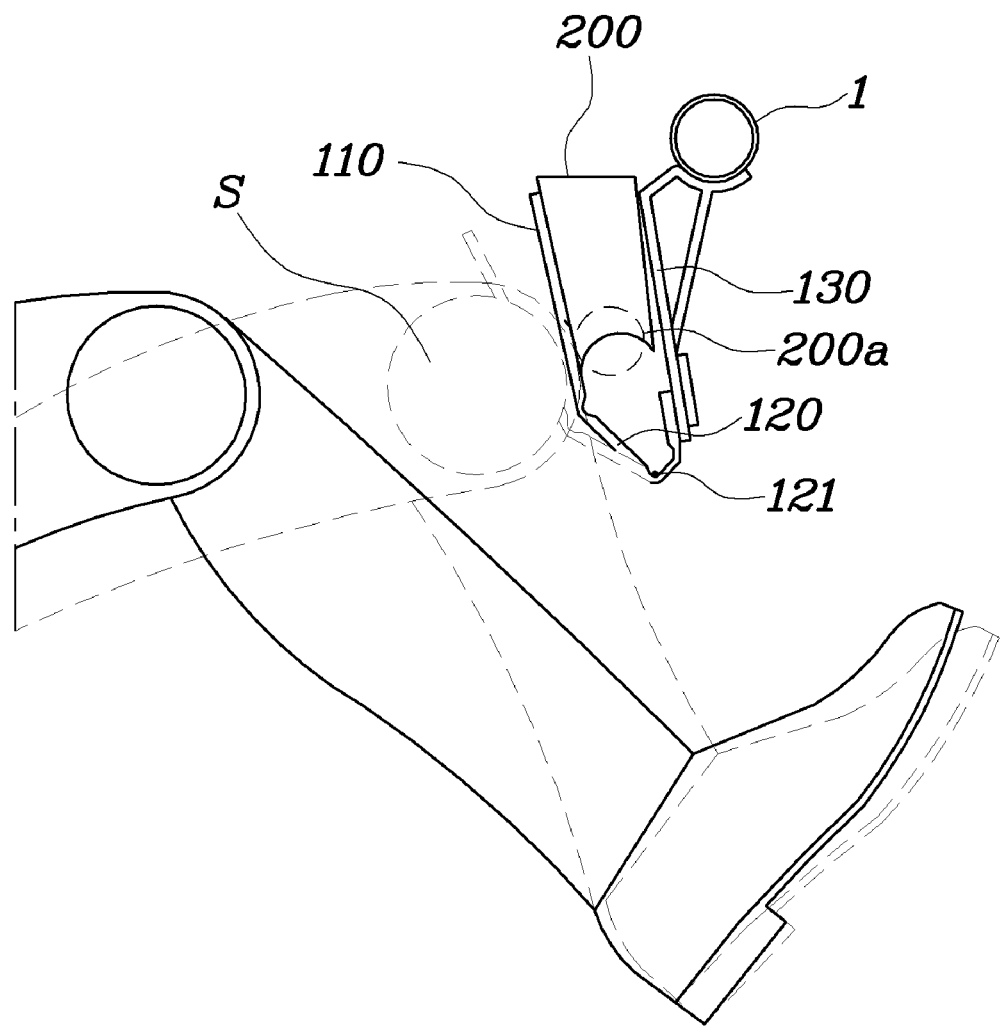
FIG. 8 is a view illustrating a state in which the knee of a 5% shorter leg strikes into the knee bolster for vehicles according to the exemplary embodiment of the present invention.

Due to the deformation inducing hole 121 and the first deformation inducing notch N1 formed in predetermined locations of the U-shaped bracket 100, the knee bolster of the present invention can realize improved knee load absorbing efficiency irrespective of the knees of short leg passengers and the knees of long leg passengers. In other words, when a front passenger of a vehicle has a short knee S, the U-shaped bracket 100 can be deformed based on the deformation inducing hole 121 and the second deformation inducing notch N2 in an accident as shown in FIG. 8. Further, when a front seat passenger of the vehicle has a long knee L, the U-shaped bracket 100 can be deformed based on the first deformation inducing notch N1 in an accident as shown in FIG. 9.

Figure 9:
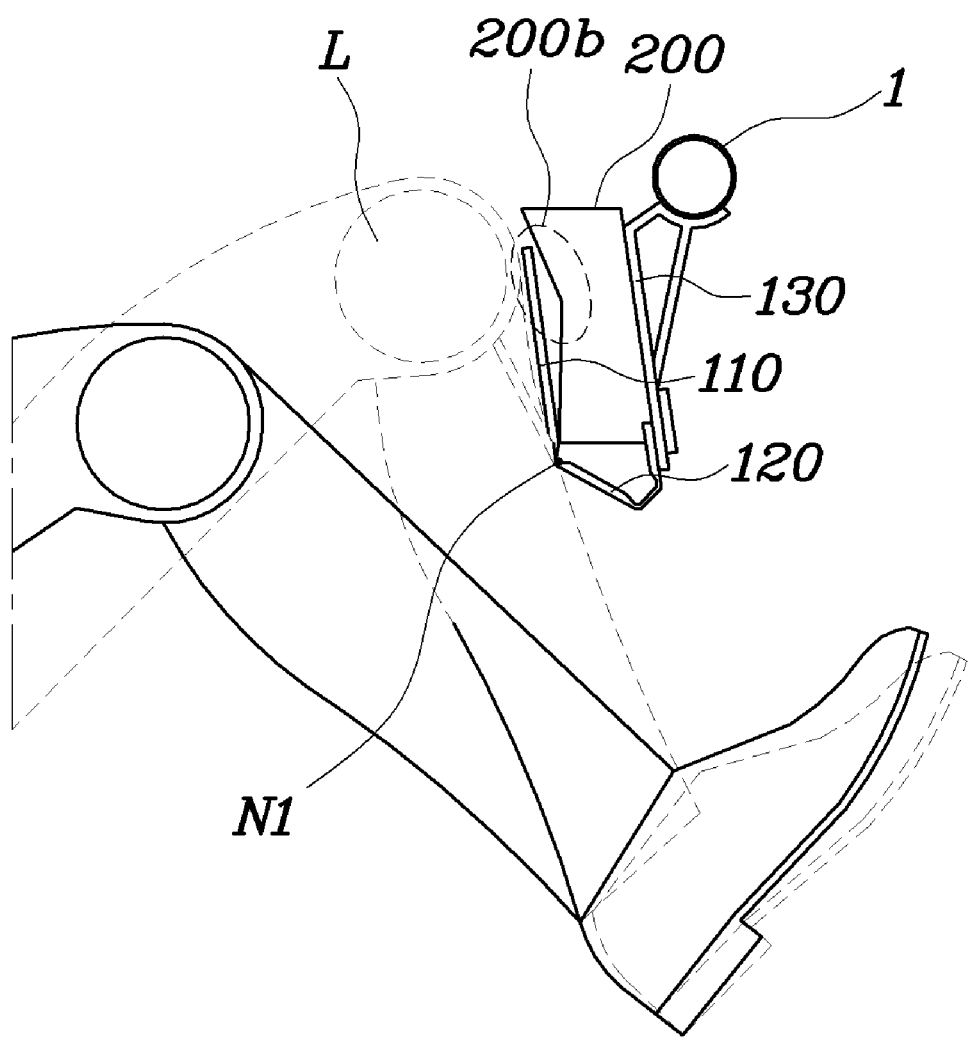
FIG. 9 is a view illustrating a state in which the knee of a 50% longer leg of a passenger strikes into the knee bolster for vehicles according to the exemplary embodiment of the present invention.

As shown in FIGS. 8 and 9, when the knee S of a 5% shorter leg strikes into the knee bolster, the deformation of the shock absorbing foam 200 for absorbing the knee load is mainly realized by the lower part 200a of the foam 200. However, when the knee L of a 50% longer leg strikes into the knee bolster, the deformation of the shock absorbing foam 200 for absorbing the knee load is mainly realized in the upper part 200b of the foam 200.

Figure 10:
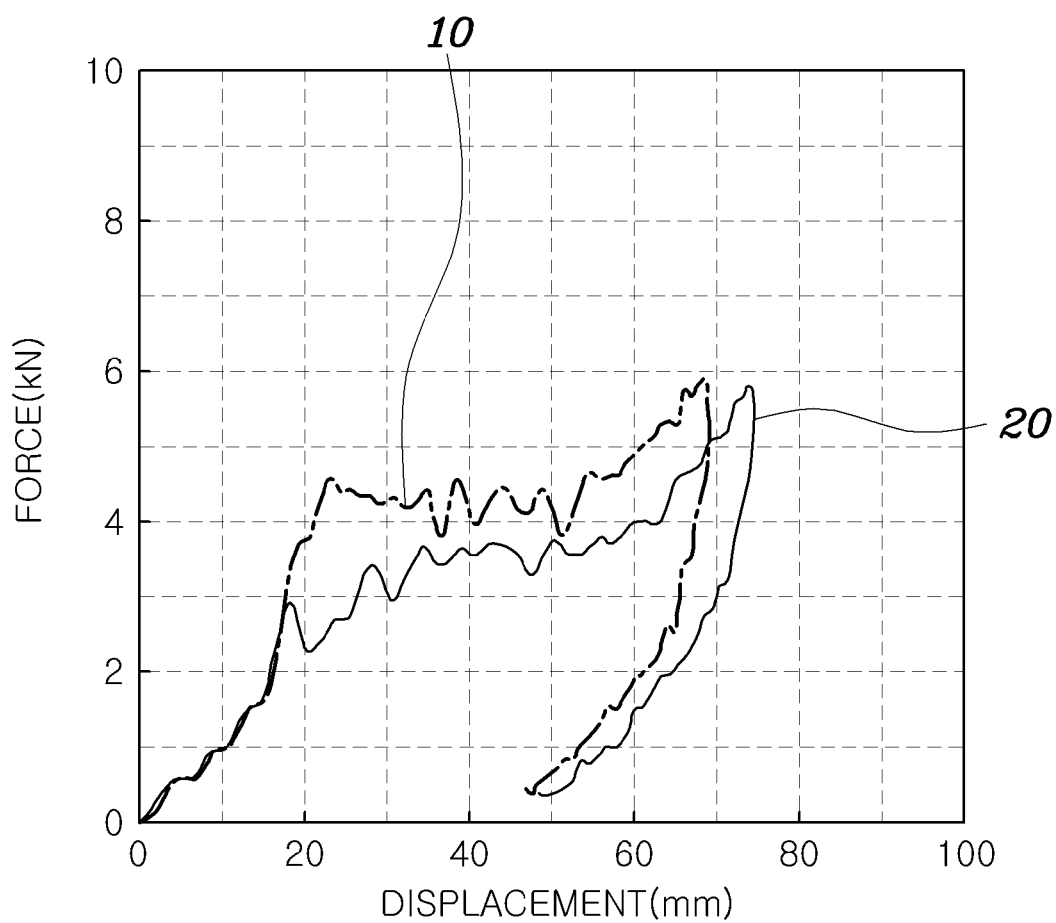
FIG. 10 is a graph which illustrates a comparison of knee loads when the knee of a 50% longer leg strikes into the knee bolster for vehicles according to the exemplary embodiment of the present invention and strikes a conventional the knee bolster for vehicles.
Figure 11:
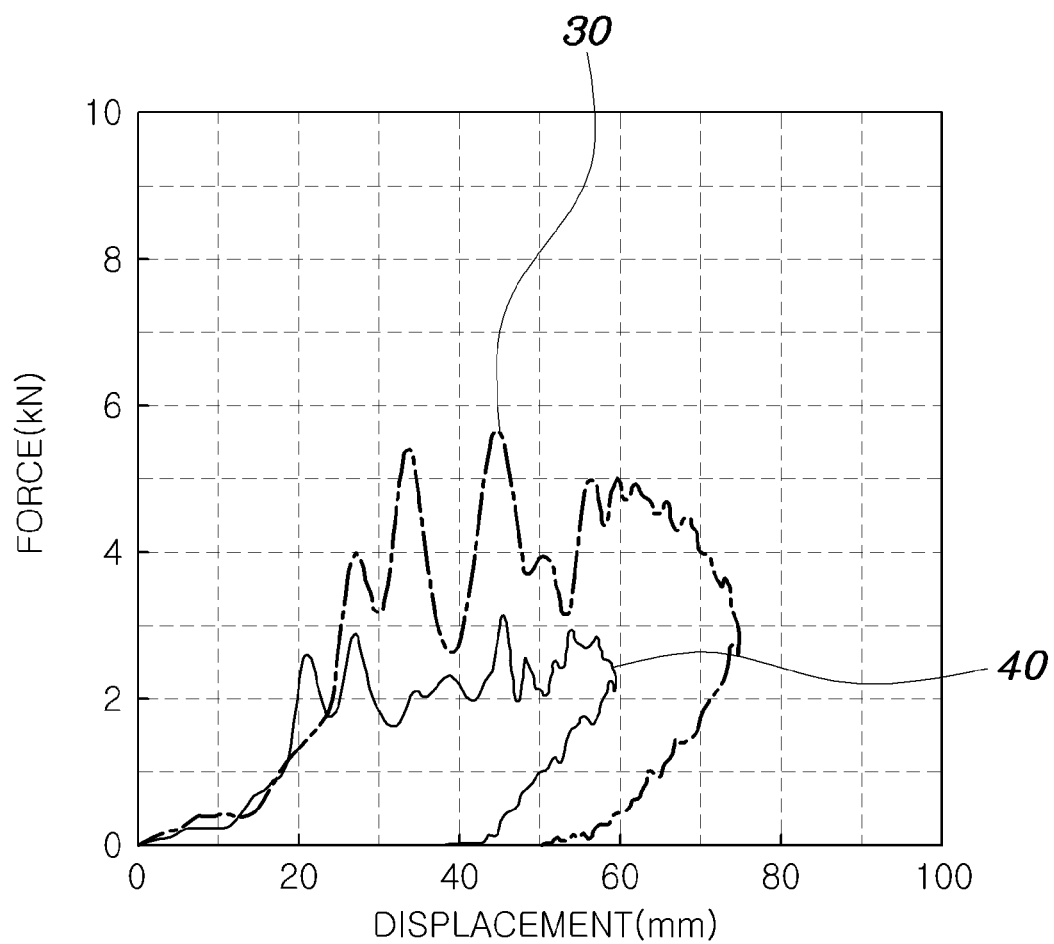
FIG. 11 is a graph which illustrates a comparison of knee loads when the knee of a 5% shorter leg strikes into the knee bolster for vehicles according to the exemplary embodiment of the present invention and strikes into the conventional knee bolster for vehicles.

The operational effects of the knee bolster for vehicles according to an exemplary embodiment of the present invention, which is installed in a vehicle, can be certified from the knee load diagrams of FIGS. 10 and 11, in which the operational effects of the knee bolster for vehicles of the present invention are compared to those of the conventional knee bolster for vehicles shown in FIG. 1.

As illustrated in FIGS. 10 and 11, when the knee L of a 50% longer leg strikes into the knee bolster according to the exemplary embodiment of the present invention and into the conventional knee bolster, it is noted that the knee bolster of the present invention reduces the knee load in the initial stage of crash when the knee load diagram 20 of the present knee bolster is compared with the knee load diagram 10 of the conventional knee bolster. Further, when the knee S of a 5% shorter leg strikes into the two types of knee bolsters, it is noted that the present knee bolster reduces the knee load for all the stages of a crash when the knee load diagram 40 of the present knee bolster is compared with the knee load diagram 30 of the conventional knee bolster.

As is apparent from the above description, the knee bolster for vehicles according to an exemplary embodiment of the present invention provides advantages in that the combined structure of the U-shaped bracket 100 and the shock absorbing foam 200 is used in the knee bolster and thus can absorb the knee load of a passenger in an accident twice, by deformation of the U-shaped bracket 100 and by deformation of the shock absorbing foam 200, so that the knee bolster of the present invention can achieve compliance with the pedestrian protection regulations of the reinforced North American NCAP.

Further, the combined structure of the U-shaped bracket 100 and the shock absorbing foam 200 reduces the size of the knee bolster for vehicles so that the knee bolster of the present invention can reduce the weight of vehicles and can be easily used in passenger cars for which the layout is difficult to design. Further, the shock absorbing foam 200 can be combined with the U-shaped bracket 100 without separate hardware being used, thus reducing the production cost and realizing a simple production process.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A knee bolster for vehicles, which is placed inside a lower instrument panel of a vehicle and is mounted to a cowl cross bar and relieves shock applied to knees of a passenger in case of an accident, the knee bolster comprising:
   a U-shaped bracket mounted to the cowl cross bar and bent to form a U-shape to be deformed by at external force during the accident, thus primarily absorbing knee load of the passenger; and
   a shock absorbing foam mounted in the U-shaped bracket, being deformed by the external force during the accident, and sliding along inner surface of the U-shaped bracket, thus secondarily absorbing knee load of the passenger,
   wherein the shock absorbing foam includes:
   a sliding protrusion formed in a front part of the shock absorbing foam;
   a sliding groove formed in a rear part of the shock absorbing foam; and
   a locking protrusion formed in the sliding groove.

2. The knee bolster for vehicles as set forth in claim 1, wherein the U-shaped bracket comprises:
   a rear unit mounted to the cowl cross bar and extending downwards with a predetermined length;
   a U-shaped front unit connected to a lower part of the rear unit; and
   a reinforcing unit extending between upper and lower parts of the rear unit and reinforcing a rear strength of the U-shaped bracket.

3. The knee bolster for vehicles as set forth in claim 2, wherein the front unit comprises:
   a U-shaped body part attached to the rear unit; and
   an extension part extending upwards from the U-shaped body part to form the U-shape.

4. The knee bolster for vehicles as set forth in claim 3,
   wherein the U-shaped bracket includes a guide groove formed in the extension part of the front unit of the U-shaped bracket and slidably receives the shock absorbing foam to guide sliding movement of the shock absorbing foam when the external force is applied thereto; and
   wherein the rear unit of the U-shaped bracket includes a locking hole to lock the shock absorbing foam to the rear unit temporarily.

5. The knee bolster for vehicles as set forth in claim 3, wherein the U-shaped body part of the front unit is provided with a deformation inducing hole for inducing deformation of the U-shaped bracket in response to striking of a knee of an approximately 5% shorter leg into the knee bolster.

6. The knee bolster for vehicles as set forth in claim 5, wherein a second deformation inducing notch is formed around the deformation inducing hole.

7. The knee bolster for vehicles as set forth in claim 3, wherein a first deformation inducing notch is formed between the extension part and the body part of the front unit and induces deformation of the U-shaped bracket in response to striking of a knee of an approximately 50% longer leg into the knee bolster.

8. The knee bolster for vehicles as set forth in claim 2, wherein an upper part of the rear unit is bent twice and forms a double bent portion, with a third deformation inducing notch and a fourth deformation inducing notch formed in the double bent portion and respectively inducing deformation of the rear part of the U-shaped bracket in response to striking of a knee of an approximately 5% shorter leg and striking of a knee of an approximately 50% longer leg into the knee bolster.

9. The knee bolster for vehicles as set forth in claim 2, wherein the rear unit, the body part of the front unit and the reinforcing unit of the U-shaped bracket are coupled to each other in an overlapping manner, this forming an overlapping reinforcement part which reinforces the rear strength of the U-shaped bracket in an accident.

* * * * *